US012380393B2

(12) United States Patent
Tanaka et al.

(10) Patent No.: US 12,380,393 B2
(45) Date of Patent: Aug. 5, 2025

(54) UNMANNED AERIAL DEVICE, INFORMATION PROCESSING METHOD, AND COMPUTER-READABLE MEDIUM THAT RECORDS CONTROL PROGRAM

(71) Applicant: Rakuten Group, Inc., Tokyo (JP)

(72) Inventors: Daiki Tanaka, Tokyo (JP); Toshiaki Tazume, Tokyo (JP); Takayoshi Inuma, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 213 days.

(21) Appl. No.: 18/172,815

(22) Filed: Feb. 22, 2023

(65) Prior Publication Data

US 2023/0297934 A1 Sep. 21, 2023

(30) Foreign Application Priority Data

Mar. 16, 2022 (JP) ................................. 2022-040927

(51) Int. Cl.
*G06Q 10/083* (2024.01)
*B64U 10/14* (2023.01)
(Continued)

(52) U.S. Cl.
CPC ........... *G06Q 10/083* (2013.01); *B64U 10/14* (2023.01); *G05D 1/101* (2013.01); *G06K 7/1417* (2013.01);
(Continued)

(58) Field of Classification Search
None
See application file for complete search history.

(56) References Cited

U.S. PATENT DOCUMENTS 10,997,544 B1* 5/2021 Bar-Zeev .................. B64F 1/18
2020/0056739 A1* 2/2020 Strahlendorf ............ G08G 5/22
(Continued)

FOREIGN PATENT DOCUMENTS

JP 6902307 B1 7/2021
JP 2021-115456 A 8/2021

OTHER PUBLICATIONS

Brunner et al., "The Urban Last Mile Problem: Autonomous Drone Delivery to Your Balcony," International Conference on Unmanned Aircraft Systems (ICUAS), IEEE, Jun. 11-14, 2019, pp. 1005-1012 (8 pages total), XP033598080.

*Primary Examiner* — James J Lee
*Assistant Examiner* — Melanie G Huber
(74) *Attorney, Agent, or Firm* — Sughrue Mion, PLLC

(57) ABSTRACT

An unmanned aerial vehicle executes: a movement control process that moves the unmanned aerial vehicle to a delivery area including a delivery address to which a package is to be delivered, the delivery area including delivery destination candidates, and each of the delivery destination candidates including an identification information indicator located at a position where the identification information indicator is readable from outside; an identification information acquiring process that acquires identification information associated with each delivery destination candidate by reading a corresponding identification information indicator; a delivery destination identifying process that identifies, as a delivery destination, a delivery destination candidate in which the acquired identification information matches the delivery address; a position identifying process that identifies a receiving position of the package based on a position of the identified delivery destination; and a placing process that places the package at the identified receiving position.

11 Claims, 9 Drawing Sheets

(51) Int. Cl.
  *B64U 101/20* (2023.01)
  *B64U 101/64* (2023.01)
  *B64U 101/67* (2023.01)
  *G05D 1/00* (2024.01)
  *G06K 7/14* (2006.01)

(52) U.S. Cl.
  CPC ...... *B64U 2101/20* (2023.01); *B64U 2101/64* (2023.01); *B64U 2101/67* (2023.01); *B64U 2201/00* (2023.01)

(56) References Cited

U.S. PATENT DOCUMENTS

| | | | |
|---|---|---|---|
| 2020/0080865 A1* | 3/2020 | Ervin | G01C 21/3667 |
| 2020/0180880 A1* | 6/2020 | Gil | A47G 29/141 |
| 2020/0198801 A1* | 6/2020 | Carthew | B64U 70/30 |
| 2020/0207474 A1* | 7/2020 | Foggia | G05D 1/0676 |
| 2021/0174301 A1 | 6/2021 | Abeywardena et al. | |
| 2021/0228009 A1 | 7/2021 | Nakanishi | |
| 2022/0274706 A1 | 9/2022 | Suzuki | |

* cited by examiner

| Delivery Number | User ID | Delivery Address | Delivery Date | Delivery Time Period | Notification Destination | Delivery Status |
|---|---|---|---|---|---|---|
| **** | **** | **** | **** | 09:00~11:00 | **** | Delivery Completed |
| **** | **** | **** | **** | 13:00~15:00 | **** | Not Yet Delivered |
| **** | **** | **** | **** | 16:00~18:00 | **** | Not Yet Delivered |
| ⋮ | ⋮ | ⋮ | ⋮ | ⋮ | ⋮ | ⋮ |

UNMANNED AERIAL DEVICE, INFORMATION PROCESSING METHOD, AND COMPUTER-READABLE MEDIUM THAT RECORDS CONTROL PROGRAM

BACKGROUND

1. Field

The present disclosure relates to an unmanned aerial vehicle, an information processing method, and a computer-readable medium that records a control program.

2. Description of Related Art

Unmanned aerial vehicles that deliver a package have been in practical use. The delivery performed by the unmanned aerial vehicle has a problem on how to pass a package.

The proposed methods include a method in which a user moves to a place where the unmanned aerial vehicle lands and a method in which the unmanned aerial vehicle delivers a package to a dwelling unit. The method in which the unmanned aerial vehicle delivers a package to a dwelling unit provides advantages, such as improvement of the convenience for the user.

Japanese Patent No. 6902307 discloses an example of a flying object that includes a mount using the method in which the unmanned aerial vehicle delivers packages to dwelling units is employed. The mount is a section on which a mounted object to be delivered can be mounted. The mount is lowered to a predetermined position (e.g., a port) by the flying object feeding a string. Then, the mounted object is separated from the mount that has descended to the predetermined position. After the separation, the string is wound to elevate the mount to a position relatively near the flying object again. After the string is elevated to a predetermined position, the flying object starts to move toward the next destination.

To deliver a package to each dwelling unit, the unmanned aerial vehicle needs to identify the dwelling unit of a delivery destination from the dwelling units. The delivery destination may be identified as follows. First, the appearance of a delivery destination candidate is recorded in advance. Then, the delivery destination is identified from the outside of the multi-dwelling unit based on the appearance of each dwelling unit.

However, if dwelling units each having a similar appearance are arranged, it is difficult to identify the delivery destination based on the appearance. Additionally, if dwelling units have no delivery history, it is impossible to identify the delivery destination based on the appearance.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An unmanned aerial vehicle according to an aspect of the present disclosure is configured to execute: a movement control process that moves the unmanned aerial vehicle to a delivery area including a delivery address to which a package is to be delivered, the delivery area including one or more delivery destination candidates, and each of the one or more delivery destination candidates including an identification information indicator located at a position where the identification information indicator is readable from outside; an identification information acquiring process that acquires identification information associated with each of the one or more delivery destination candidates by reading a corresponding one of the one or more identification information indicators; a delivery destination identifying process that identifies, as a delivery destination, a delivery destination candidate in which the acquired identification information matches the delivery address; a position identifying process that identifies a receiving position of the package based on a position of the identified delivery destination; and a placing process that places the package at the identified receiving position.

In an information processing method according to an aspect of the present disclosure, a computer controls an unmanned aerial vehicle to execute: a movement control process that moves the unmanned aerial vehicle to a delivery area including a delivery address to which a package is to be delivered, the delivery area including one or more delivery destination candidates, and each of the one or more delivery destination candidates including an identification information indicator located at a position where the identification information indicator is readable from outside; an identification information acquiring process that acquires identification information associated with each of the one or more delivery destination candidates by reading a corresponding one of the one or more identification information indicators; a delivery destination identifying process that identifies, as a delivery destination, a delivery destination candidate in which the acquired identification information matches the delivery address; a position identifying process that identifies a receiving position of the package based on a position of the identified delivery destination; and a placing process that places the package at the identified receiving position.

A computer-readable medium according to an aspect of the present disclosure records a control program that causes a computer that controls an unmanned aerial vehicle to execute: a movement control process that moves the unmanned aerial vehicle to a delivery area including a delivery address to which a package is to be delivered, the delivery area including one or more delivery destination candidates, and each of the one or more delivery destination candidates including an identification information indicator located at a position where the identification information indicator is readable from outside; an identification information acquiring process that acquires identification information associated with each of the one or more delivery destination candidates by reading a corresponding one of the one or more identification information indicators; a delivery destination identifying process that identifies, as a delivery destination, a delivery destination candidate in which the acquired identification information matches the delivery address; a position identifying process that identifies a receiving position of the package based on a position of the identified delivery destination; and a placing process that places the package at the identified receiving position.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

An unmanned aerial vehicle 30, an information processing method, and a program according to a first embodiment will now be described.

Configuration of Logistics System

Figure 1:
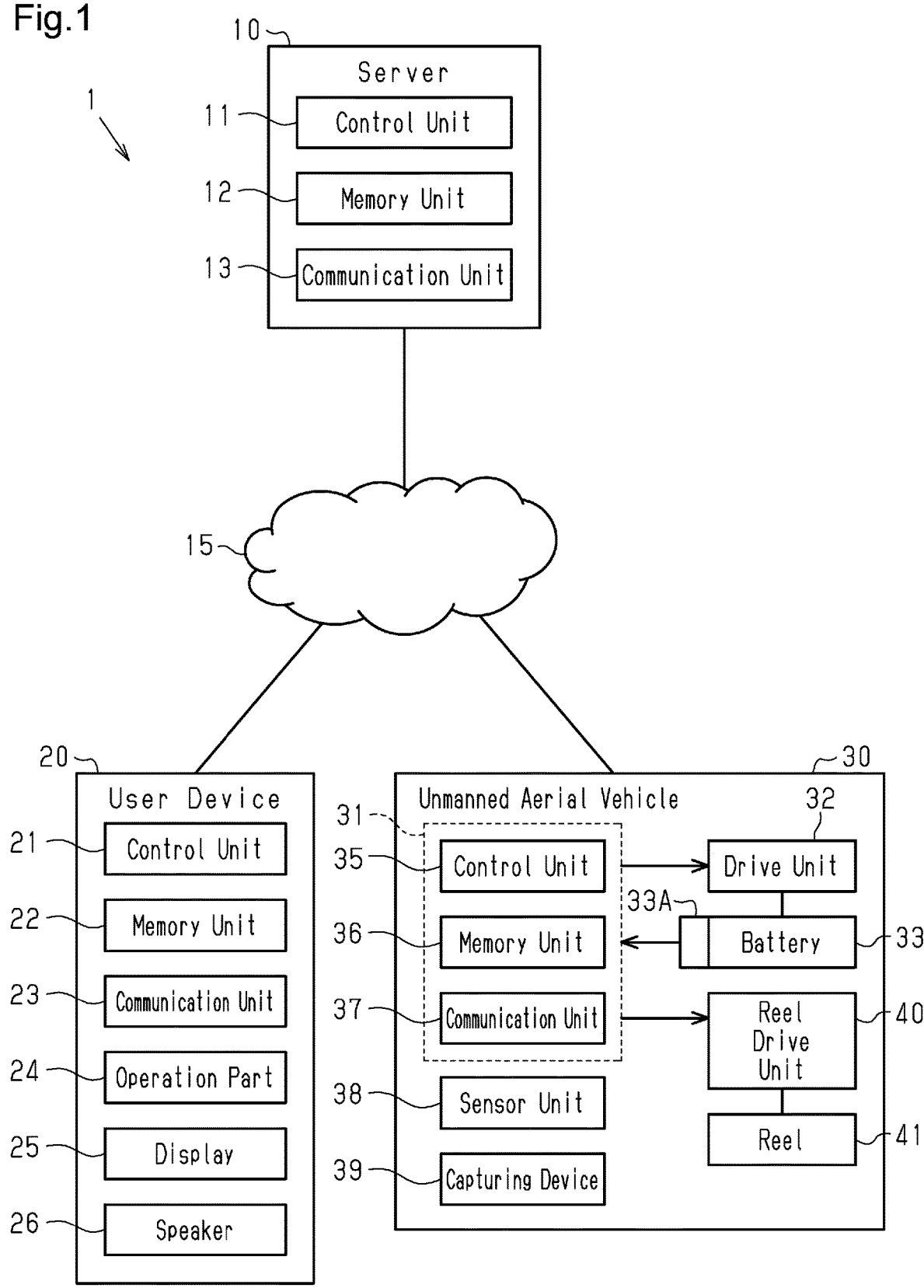
FIG. 1 is a diagram schematically showing the configuration of a logistics system according to a first embodiment.

As shown in FIG. 1, a logistics system 1 includes a server 10, a user device 20, and the unmanned aerial vehicle 30. The logistics system 1 is configured to deliver a package to the delivery address of a user. The logistics system 1 is an example of an information processing system.

Server

The server 10 is managed by a logistics manager, and includes one or more information processing devices. The server 10 includes a control unit 11, a memory unit 12, and a communication unit 13. The control unit 11 includes an arithmetic logic unit and a memory (memory medium). The arithmetic logic unit loads an operating system and various programs (e.g., logistics management program) onto the memory from the memory unit 12 or another storage, and executes instructions retrieved from the memory. The arithmetic logic unit includes one or more circuits (circuitry) such as a central processing unit (CPU). The memory unit 12 is an auxiliary storage device (memory medium), and includes various types of information used to manage logistics. The communication unit 13 is implemented as hardware, software, or a combination thereof. The communication unit 13 sends and receives data to and from the user device 20 and the unmanned aerial vehicle 30 via a network 15. The server 10 may include an operation part and a display part for which a logistics manager or the like performs an input operation.

User Device

The user device 20 is an information processing device used by a user who uses the logistics system 1. The user device 20 is a smartphone (multi-functional telephone terminal), a tablet terminal, a personal computer, a wearable computer, or another information processing device capable of displaying images.

The user device 20 includes a control unit 21, a memory unit 22, a communication unit 23, an operation part 24, a display 25, and a speaker 26. The control unit 21 includes an arithmetic logic unit and a memory. The arithmetic logic unit loads an operating system and programs related to delivery and pickup onto the memory from the memory unit 22 or another storage, and executes instructions retrieved from the memory. The arithmetic logic unit includes one or more arithmetic circuits such as a CPU, a graphic processing unit (GPU), or a neural network processing unit (NPU). The memory unit 22 is an auxiliary storage device (memory medium) and stores various types of information related to a user. The memory unit 22 may implement a program capable of receiving a notification related to delivery. This program may be a dedicated program for receiving the offer of delivery services, or may be a program using a social networking service. Alternatively, the program may be an email software capable of receiving a notification email. The communication unit 23 is implemented as hardware, software, or a combination thereof. The communication unit 23 sends and receives data to and from the server 10 via the network 15. The operation part 24 is a touch panel integrated with the display 25. Alternatively, the operation part 24 is, for example, an operation button, a keyboard, a mouse, or a controller on a housing or the like of the user device 20. The display 25 outputs various types of images according to an output instruction of the control unit 21. The speaker 26 is capable of outputting a sound related to delivery.

Unmanned Aerial Vehicle

The unmanned aerial vehicle 30 is an aerial vehicle without a person onboard, and is a device managed by a logistics manager or the owner of the unmanned aerial vehicle 30. The unmanned aerial vehicle 30 is also referred to as an unmanned flying object or a drone. The unmanned aerial vehicle 30 includes a control device 31, a drive unit 32, a battery 33 (energy source), a sensor unit 38, a capturing device 39, a reel drive unit 40, and a reel 41. The control device 31 controls the drive unit 32. The drive unit 32 includes a drive source that is driven by the electric power supplied from the battery 33 and a rotary wing that is operated by the power from the drive source. In the present embodiment, the drive source is an electric motor. The drive unit 32 may be an engine that is driven by consuming fuel. In this case, instead of the battery 33, a fuel supplying unit that supplies the drive unit 32 with fuel is disposed as the energy source. The unmanned aerial vehicle 30 may include a hybrid drive unit 32 equipped with various types of drive sources. The battery 33 is a rechargeable battery, which can be charged. The control unit 35 obtains the remaining capacity of the battery 33 from a remaining capacity detection circuit 33A in the battery 33.

The sensor unit 38 includes a global positioning system (GPS) sensor that detects a current location. The sensor unit 38 may include at least one of a sensor that detects wind direction and wind speed, an acceleration sensor, a gyro sensor, an infrared sensor, a geomagnetic sensor, an altitude sensor, a displacement sensor, and a temperature sensor. The control device 31 acquires position information from the sensor unit 38 to identify the position of the unmanned aerial vehicle 30.

The unmanned aerial vehicle 30 includes one or more capturing devices 39. Examples of the capturing device 39 include a visible light camera. The control device 31 is capable of adjusting the optical axis of the capturing device 39. Alternatively, the control device 31 is capable of acquiring captured data at a predetermined angle of view from one of multiple cameras, each having an optical axis directed in a different direction. The control device 31 performs image processing on the captured data acquired from the visible light camera to recognize an obstacle, the receiving position of a package, and the like. The capturing device 39 may be a time-of-flight (ToF) sensor that measures and detects the time of flight from when emitted light is reflected on a target to when the light returns. Specifically, the ToF sensor uses a dot projector to project non-visible dots. Then, the ToF sensor detects reflected light on a dot pattern to generate depth information related to the surrounding environment. The control device 31 acquires captured data that is obtained by capturing a two-dimensional code from the capturing device 39. The two-dimensional code is a figure in which encoded information is patterned. In the present embodiment, the two-dimensional code is a QR Code® and is schematically shown in the drawings. The two-dimensional code does not have to be a QR code. Instead, the two-dimensional code may be a Matrix code or a stack code. The control device 31 analyzes the captured data obtained by capturing the two-dimensional code to acquire the information contained in the two-dimensional code.

The reel 41 is used to let out and wind up a cable. During delivery, a package is fixed to the end of the cable. The reel drive unit 40 includes a motor and a windup mechanism. The end of the cable includes, for example, a hook from which a package can be separated. The hook may include a mechanism that separates a package when the cable slackens to reduce the tension of the hook. Alternatively, a package can be separated from the hook when turned on or off. During delivery, the reel drive unit 40 lets the cable out of the reel 41 and lowers the package to the receiving position. When the package reaches a target position, the reel drive unit 40 releases the hook from the cable to separate the package. After separating the package, the reel drive unit 40 winds up the cable.

The control device 31 includes a control unit 35, a memory unit 36, and a communication unit 37. The control unit 35 has a similar configuration to the control unit 11 of the server 10 or the control unit 21 of the user device 20. The memory unit 36 has a similar configuration to the memory unit 12 of the server 10 or the memory unit 22 of the user device 20. In addition to an autonomous flying program and an image processing program, the memory unit 36 may store various types of information (e.g., map information and delivery address).

Figures 2, 3:
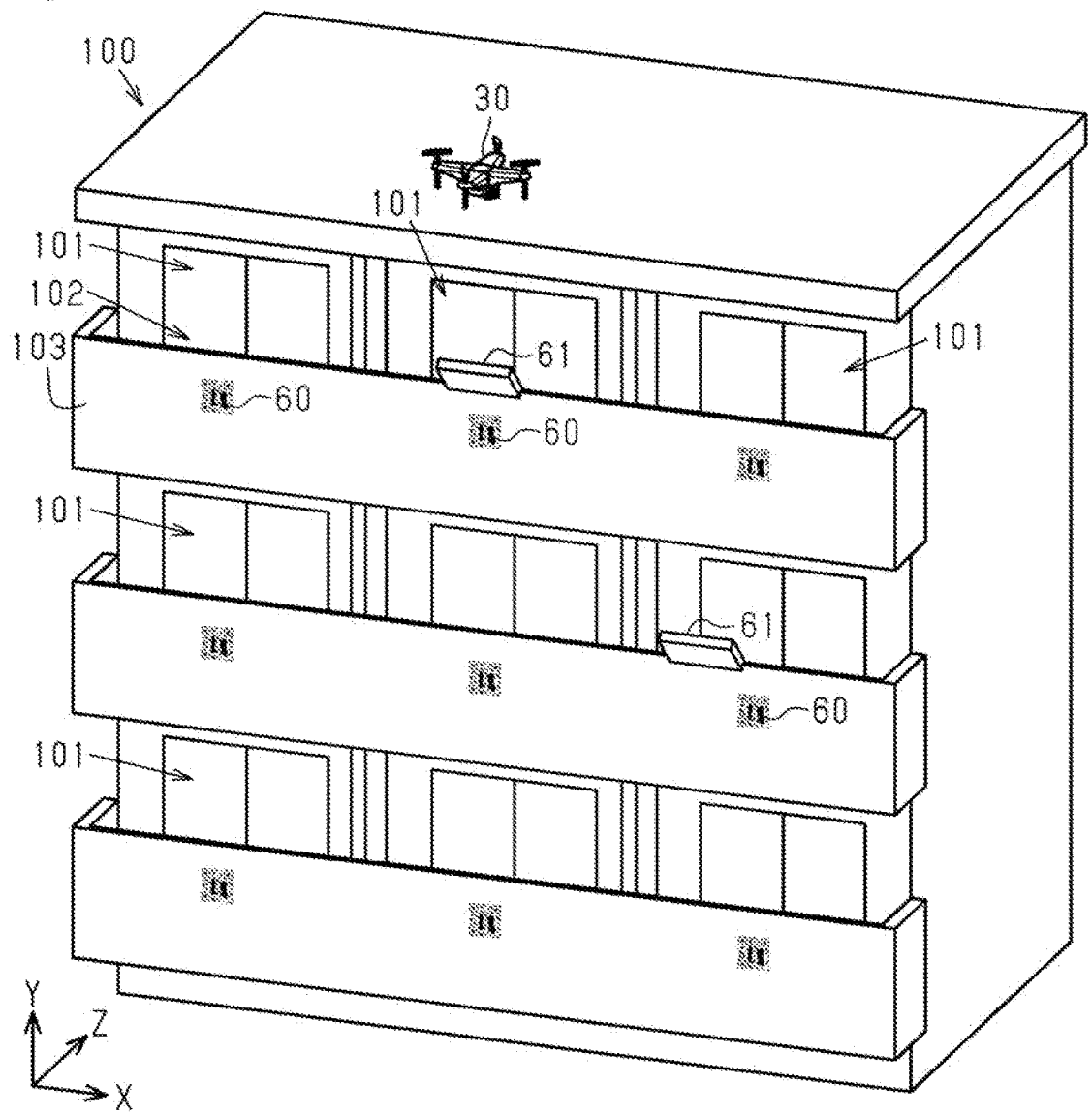
FIG. 2 is a diagram schematically showing the data configuration of user information in the first embodiment.
FIG. 3 is a diagram schematically showing a multi-dwelling unit that includes delivery destination candidates in the first embodiment.

FIG. 2 shows an example of delivery data 50 that is stored in the memory unit 12 of the server 10. The delivery data 50 includes a delivery number, a user ID, a delivery address, a delivery date, a delivery time period, a notification destination, and a delivery status. The delivery number is allocated to a package that is to be delivered. The user ID belongs to a user who receives a package. The delivery address is the address of a user. The delivery date and the delivery time period indicate the time at which a package is scheduled to be delivered. The notification destination is a destination selected when a user subject to delivery is notified. The notification device is a device token associated with the email address of the user or the user device 20. The delivery status indicates whether the delivery of a package is completed.

The unmanned aerial vehicle 30 acquires the delivery data 50 from the server 10. Based on the delivery data 50, the unmanned aerial vehicle 30 delivers a package to a delivery destination.

Where to Attach Identification Information Indicator

The dwelling unit in which its resident can receive a package from the unmanned aerial vehicle 30 corresponds to a delivery destination candidate of the unmanned aerial vehicle 30. The dwelling unit of the delivery destination candidate includes an identification information indicator located at a position where the identification information indicator is readable by a predetermined device. The dwelling unit including the identification information indicator may be a standalone house or may be included in a multi-dwelling unit. Particularly, the dwelling units in a multi-dwelling unit each have a similar appearance. Thus, it is difficult for the unmanned aerial vehicle 30 to identify the dwelling unit of the delivery destination only based on the appearance. In the present embodiment, an example in which each dwelling unit in a multi-dwelling unit has an identification information indicator will be described.

FIG. 3 shows a multi-dwelling unit 100 that includes one or more identification information indicators 60. The height direction of the multi-dwelling unit 100 is referred to as a height direction Y. The direction in which dwelling units 101 are arranged on the same floor is referred to as a width direction X. The horizontal direction that is orthogonal to the width direction X is referred to as a depth direction Z. The identification information indicators 60 may be respectively disposed at all the dwelling units 101 of the multi-dwelling unit 100. Alternatively, the identification information indicator 60 may be disposed only at a dwelling unit 101 where its resident uses delivery services provided by the unmanned aerial vehicle 30.

In the present embodiment, the identification information indicator 60 is a two-dimensional code in which encoded identification information is patterned. Each dwelling unit 101 has a different two-dimensional code. The example of FIG. 3 schematically shows two-dimensional codes.

Each identification information indicator 60 is located at a position where the identification information indicator is capturable by the capturing device 39 from outside of the multi-dwelling unit 100. The identification information indicator 60 is sized such that the identification information indicator 60 can be analyzed by the unmanned aerial vehicle 30 from outside of the multi-dwelling unit 100. In the example of FIG. 3, the identification information indicators 60 are attached to a parapet 103 of a balcony 102. The side surface of the parapet 103 correspond to the side surface of the multi-dwelling unit 100 on which the identification information indicators 60 are arranged.

The identification information embedded in each identification information indicator 60 can be used to recognize a corresponding dwelling unit 101 or the user who resides in a corresponding dwelling unit 101. For example, the identification information is the room number of each dwelling unit 101, and corresponds to the address shown in the delivery data 50. The unmanned aerial vehicle 30 identifies the room number of each dwelling unit 101 by reading a corresponding identification information indicator 60 with the capturing device 39 and decoding the read captured data.

The balcony 102 of each dwelling unit 101 includes a receiving portion 61 where the user receives a package from the unmanned aerial vehicle 30. The receiving portion 61 is a member in the form of a plate, or is a tray in the form of a shallow box.

Figure 4:
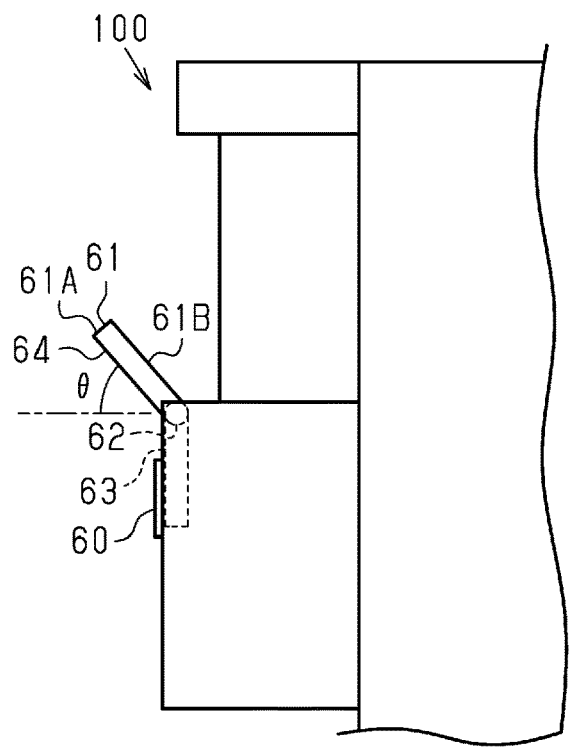
FIG. 4 is a side view schematically showing a balcony in the multi-dwelling unit in the first embodiment.

FIG. 4 shows an example of the receiving portion 61. The receiving portion 61 can be moved by a movable mechanism between an inner position 63 and an outer position 64. At the inner position 63, the receiving portion 61 is accommodated in the parapet 103. At the outer position 64, an end 61A projects outward. For example, the receiving portion 61 can be pivoted within a predetermined angle range about a rotary shaft 62 that is disposed inside the balcony 102. Alternatively, the receiving portion 61 is attached along a pole (support) of the parapet 103 such that the receiving portion 61 is slidable between the inner position 63 and the outer position 64. When the user is scheduled to receive a package, the receiving portion 61 is located at the outer position 64. When the user is not scheduled to receive a package, the receiving portion 61 is located at the inner position 63.

Each receiving portion 61 at the outer position 64 is inclined vertically (downward) as it becomes closer to the balcony 102 from the end 61A. For example, the receiving portion 61 forms an inclination angle θ of greater than 0° and less than or equal to 45° with respect to the horizontal direction. After the package lands on a front surface 61B of the receiving portion 61, the package slides down on the front surface 61B into the balcony 102. The balcony 102 may include a member that catches a package that has slid down. The receiving portions 61 do not overlap one another as viewed from above the multi-dwelling unit 100.

Summary of Processes Executed by Control Device

Processes executed by the control device 31 for the unmanned aerial vehicle 30 will now be described.

The control device 31 executes a movement control process, an identification information acquiring process, a delivery destination identifying process, a position identifying process, a placing process, and a notification process.

The movement control process is a process that moves the unmanned aerial vehicle 30 to a delivery area that includes the delivery address to which a package is to be delivered. For example, the delivery area is a region in which is the multi-dwelling unit 100 including the delivery address is centered. Alternatively, the delivery area is defined in advance for one or more multi-dwelling units.

The identification information acquiring process is a process that acquires identification information associated with one or more delivery destination candidates included in the delivery area by reading the identification information indicators 60 that are respectively located at positions seen from the outside of the delivery destination candidates. The delivery destination candidates are, for example, the dwelling units 101 of the multi-dwelling unit 100. The control device 31 acquires the captured data obtained by capturing each identification information indicator 60 at a corresponding delivery destination candidate. Then, the control device 31 uses the image of each identification information indicator 60 included in the captured data to acquire the identification information associated with a corresponding delivery destination candidate.

The delivery destination identifying process is a process that identifies, as the delivery destination, a delivery destination candidate in which the acquired identification information matches the delivery address.

The position identifying process is a process that identifies the receiving position of the package based on the position of the identified delivery destination. The control device 31 recognizes the position of the receiving portion 61 associated with the delivery destination and identifies the receiving portion 61 as the receiving position.

The placing process is a process that places the package at the identified receiving position. The unmanned aerial vehicle 30 rises to a rise end position and then lowers the cable having the end to which the package is fixed. After that, the unmanned aerial vehicle 30 places the package on the receiving portion 61. When lowering the cable, the control device 31 records a rise distance from a rise start position, which corresponds to the height of the receiving portion 61, to the rise end position and lowers the cable having the end to which the package is fixed by a length corresponding to the rise distance.

The notification process is a process that sends a notification to the user device 20 used by the user who receives the package within a period from when the unmanned aerial vehicle 30 reaches the delivery area including the delivery address to when the unmanned aerial vehicle 30 places the package at the receiving portion 61.

Procedure for Delivery

Figure 5:
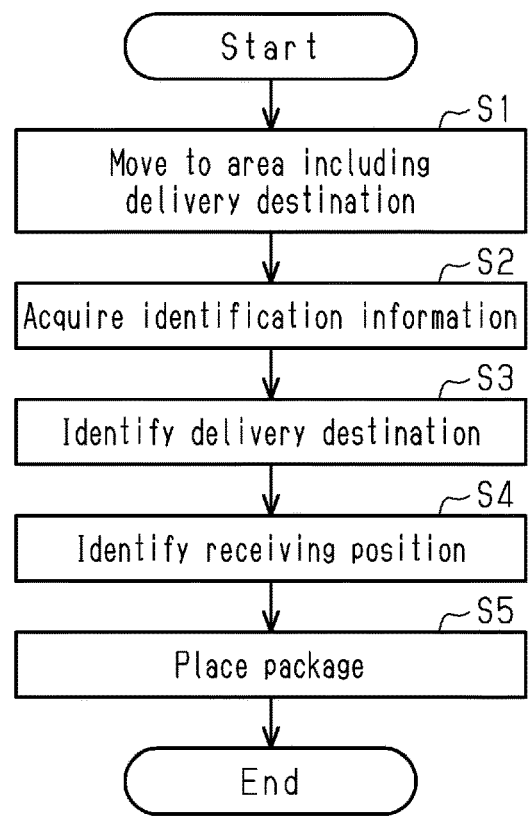
FIG. 5 is a flowchart illustrating a procedure for delivering a package in the first embodiment.

A procedure for the unmanned aerial vehicle 30 to deliver a package will now be described with reference to FIG. 5. The unmanned aerial vehicle 30 acquires the delivery data 50 from the server 10 and stores the acquired delivery data 50 in the memory unit 12. Further, a delivery manager loads the unmanned aerial vehicle 30 with a package to be delivered.

The unmanned aerial vehicle 30 moves from a station to the delivery area that includes the delivery destination, with the package loaded (step S1). The unmanned aerial vehicle 30 uses the data acquired from the sensor unit 38 or the like to autonomously fly to the delivery destination while comparing the current location with the geographical data or the like of the flying area. Part of the flying of the unmanned aerial vehicle 30 may be supported by a delivery manager in a remote place.

After the unmanned aerial vehicle 30 reaches the delivery area including the delivery address, the control device 31 moves the unmanned aerial vehicle 30 to a position. At this position, the unmanned aerial vehicle 30 can capture a side surface of the multi-dwelling unit 100 on which the identification information indicators 60 are arranged. The geographical data may store, in advance, on which side surface of the multi-dwelling unit 100 the identification information indicators 60 are arranged. Alternatively, the unmanned aerial vehicle 30 may fly around the multi-dwelling unit 100 while performing image recognition using the capturing device 39, thereby searching for the side surface on which the identification information indicators 60 are arranged.

When detecting the identification information indicators 60, the control device 31 acquires the identification information of each dwelling unit 101 (step S2). Specifically, the unmanned aerial vehicle 30 moves to a capture position which is relatively far from the multi-dwelling unit 100 and at which the identification information indicators 60 can be captured by the capturing device 39. While hovering at the capture position, the unmanned aerial vehicle 30 uses the capturing device 39 to capture the identification information indicator 60 of each dwelling unit 101. If the capturing range does not encompass all the identification information indicators 60 of the multi-dwelling unit 100, the identification information indicators 60 may be captured a number of times. The control device 31 acquires the captured data from the capturing device 39. The control device 31 detects a two-dimensional code from the acquired captured data and analyzes the two-dimensional code to acquire the identification information.

Then, the control device 31 identifies the delivery destination (step S3). Specifically, the control device 31 refers to the delivery address included in the delivery data 50 and the identification information included in the identification information indicator 60 to identify, as the dwelling unit 101 of the delivery destination, the position of the identification information indicator 60 that matches the delivery address.

Next, the control device 31 identifies the receiving position corresponding to the dwelling unit 101 of the delivery destination (step S4). Specifically, the control device 31 uses the captured data to identify the position of the receiving portion 61.

For example, a mark (e.g., a marker) is arranged on the receiving portion 61. The control device 31 searches for the mark using the captured data obtained by capturing a section relatively near the identification information indicator 60 that is identified as the delivery destination. The receiving portion 61 may be arranged in a predetermined range in which the identification information indicator 60 is centered. In this case, the control device 31 searches the captured data for the mark in a range corresponding to the predetermined range, around which the identification information indicator 60 is located. The control device 31 uses the captured data acquired from the capturing device 39 to detect the mark. Then, the control device 31 identifies the position of the mark as the position of the receiving portion 61. The mark preferably has a relatively high reflection rate. Alternatively, if the receiving portion 61 has a distinctive form, the control device 31 may extract the feature of the receiving portion 61 from the image obtained by capturing the receiving portion 61. Further, the control device 31 may set the position of the receiving portion 61 to a position on the image from which the feature is detected. For example, the control device 31 may detect the form of the outline of the receiving portion 61 as the feature.

When identifying the receiving position, the control device 31 controls the reel drive unit 40 to place the package at the receiving position (step S5). The receiving portion 61 is the front surface 61B of the receiving portion 61. After placing the package at the receiving position, the control device 31 separates the package and then winds up the cable.

At a predetermined time between steps S1 to S5, the control device 31 sets the notification destination included in the delivery data 50 as a sending destination and sends a notification to the user device 20. In a case in which the control device 31 sends the notification when the unmanned aerial vehicle 30 reaches the delivery area or the rise end position, the user can walk onto the balcony 102 and receive a package 43 that has landed on the receiving portion 61. In a case in which the control device 31 sends the notification when the placing of the package 43 is completed, the user can collect the package 43 delivered to the balcony 102. The control device 31 may send a notification at multiple times.

Motion of Unmanned Aerial Vehicle

The motion of the unmanned aerial vehicle 30 will now be described in detail with reference to FIGS. 6 to 10.

Figure 6:
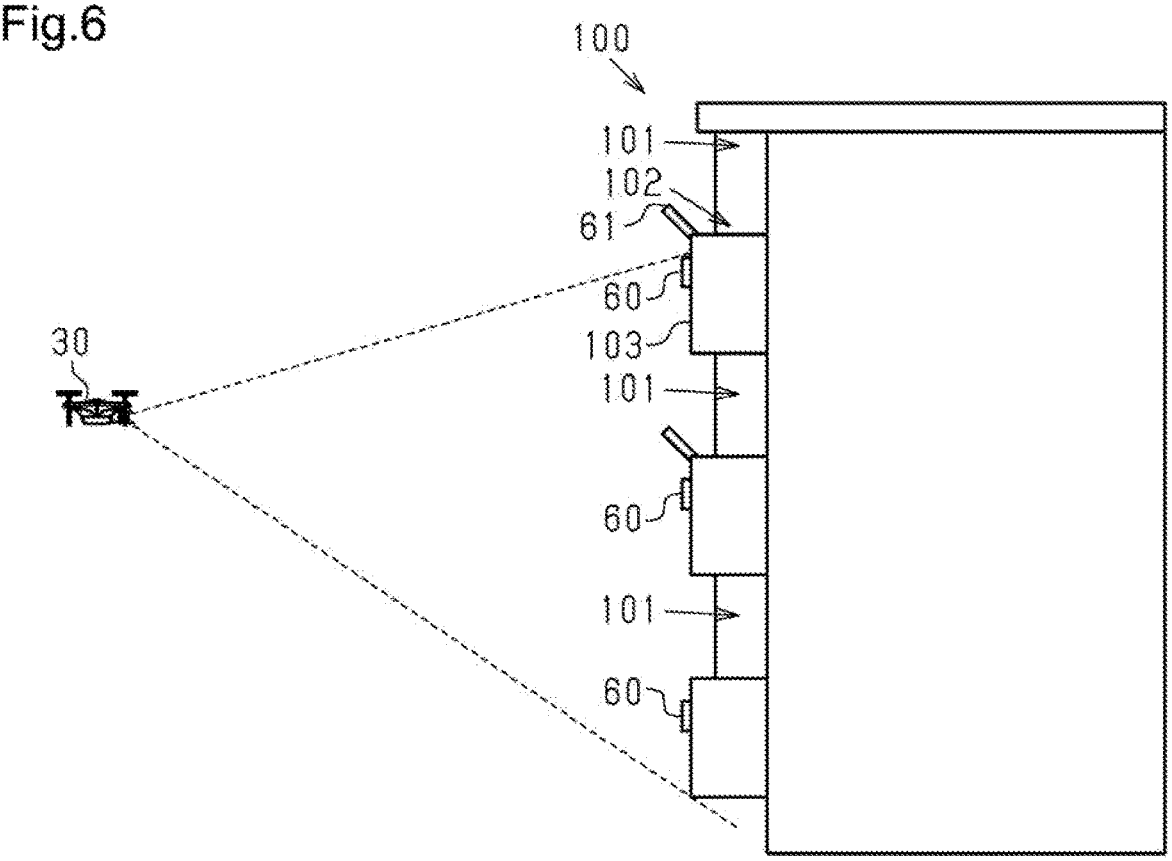
FIG. 6 is a diagram illustrating the identification information acquiring process in the first embodiment.

FIG. 6 shows a state in which the unmanned aerial vehicle 30 is hovering at the capture position in the step of acquiring the identification information (step S2). The control device 31 controls the capturing device 39 to capture the identification information indicators 60 of the multi-dwelling unit 100. When capturing the identification information indicators 60 a number of times, the control device 31 may determine whether each acquired capture datum includes the identification information indicator 60 corresponding to the delivery destination. If the control device 31 has identified the identification information indicator 60 corresponding to the delivery destination, the control device 31 does not need to capture the remaining identification information indicators 60.

Figure 7:
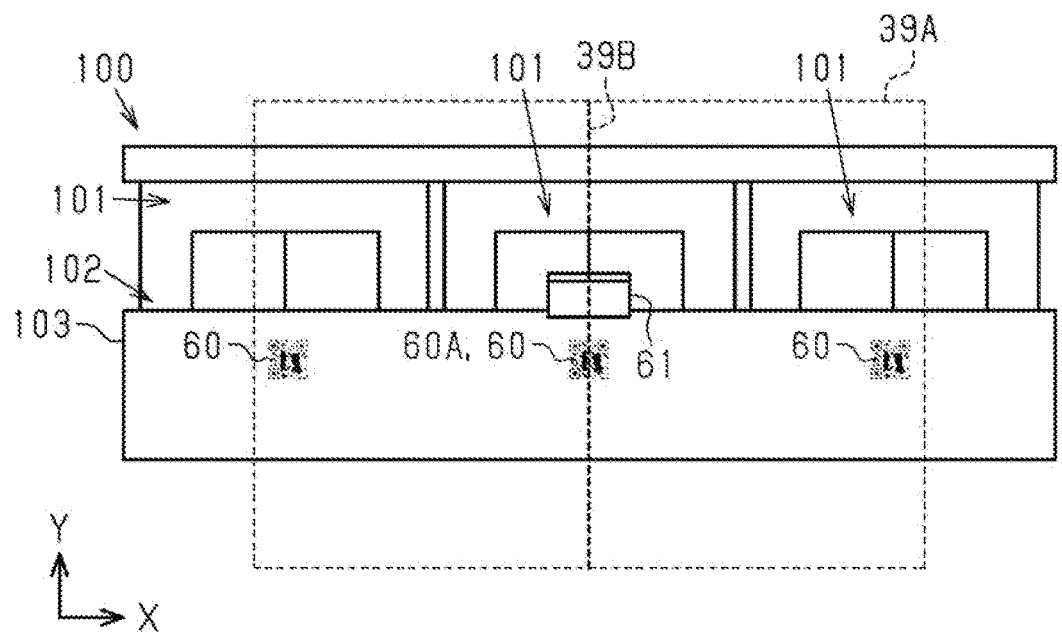
FIG. 7 is a diagram illustrating the delivery destination identifying process in the first embodiment.

FIG. 7 shows a state in which the rise start position is identified by the control device 31. The control device 31 identifies the rise start position with reference to the position of an identification information indicator 60 or a receiving portion 61. A process that identifies the rise start position with reference to the position of the identification information indicator 60 has a similar procedure to a process that identifies the rise start position with reference to the position of the receiving portion 61. Hereinafter, the process that identifies the rise start position with reference to the receiving portion 61 will be described.

The control device 31 adjusts the height of the body of the unmanned aerial vehicle 30 to be almost equal to the height of the receiving portion 61. Specifically, the control device 31 directs the optical axis of the capturing device 39 in a predetermined orientation that is horizontal or substantially horizontal, and acquires the captured data from the capturing device 39. Further, the control device 31 performs image recognition on the receiving portion 61. Then, the control device 31 adjusts the position of the body of the unmanned aerial vehicle 30 such that the receiving portion 61 is located at a predetermined position in a frame 39A (capture area) of the capturing device 39. For example, the control device 31 adjusts the position of the unmanned aerial vehicle 30 such that the receiving portion 61 is located at a middle portion 39B of the frame 39A in the width direction X. Alternatively, the control device 31 may adjust the position of the receiving portion 61 in the frame 39A to a corner of the frame 39A or the middle of the frame 39A in the width direction X and the height direction Y. When determining that the receiving portion 61 is located at the predetermined position in the frame 39A, the control device 31 sets the rise position to the position of the unmanned aerial vehicle 30 at that time. The control device 31 may calculate the distance from the unmanned aerial vehicle 30 to an identification information indicator 60A in the capture image, based on the size of the identification information indicator 60A. The control device 31 may identify the rise start position based on that distance.

Alternatively, the identification information indicator 60 and the receiving portion 61 may be arranged based on a predetermined positional relationship. For example, the example of FIG. 7 shows that the position of the identification information indicator 60 in the width direction X overlaps (i.e., is the same as) the position of the receiving portion 61. Arranging the identification information indicator 60 and the receiving portion 61 based on the predetermined positional relationship allows the unmanned aerial vehicle 30 to readily detect the receiving portion 61.

Figure 8:
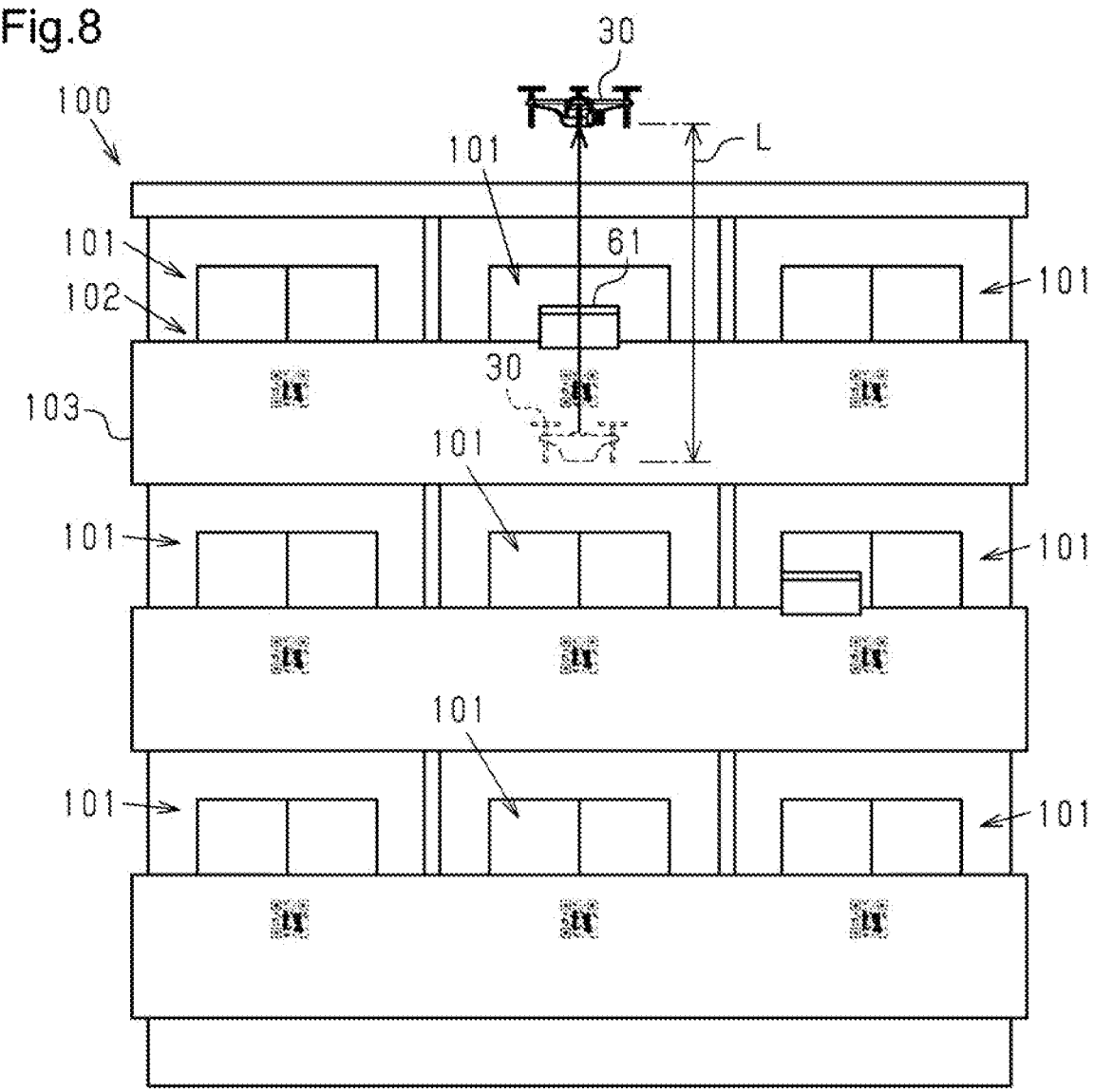
FIG. 8 is a diagram illustrating the movement of the unmanned aerial vehicle in the placing process in the first embodiment.

FIG. 8 shows a state in which the unmanned aerial vehicle 30 is rising. When identifying the rise start position, the control device 31 elevates the body of the unmanned aerial vehicle 30 from the rise start position to the rise end position. The rise end position may differ depending on the structure of the multi-dwelling unit 100 and is, for example, above the multi-dwelling unit 100. If the unmanned aerial vehicle 30 performs a task of placing a package in front of a dwelling unit 101 of the multi-dwelling unit 100, the residents in the residence may be shown in the captured data captured by the capturing device 39. If the unmanned aerial vehicle 30 performs a task of placing a package at the height of a balcony 102, the propeller or the like of the unmanned aerial vehicle 30 may contact the residence or the like. For this reason, the rise end position is preferably above the multi-dwelling unit 100.

The control device 31 elevates the body of the unmanned aerial vehicle 30 by driving the drive unit 32 while checking the position of the multi-dwelling unit 100 with the capturing device 39. Further, the control device 31 performs image recognition or the like to determine whether the unmanned aerial vehicle 30 has reached a position above the multi-dwelling unit 100. After determining that the unmanned aerial vehicle 30 has reached the position above the multi-dwelling unit 100, the control device 31 stops elevating the unmanned aerial vehicle 30 and then causes the unmanned aerial vehicle 30 to hover. While elevating the body, the control device 31 uses the altitude sensor to acquire a rise distance L from the rise start position. Since the rise start position is almost equal to the height of the receiving portion 61, the rise distance L is almost equal to the distance from the height of the receiving portion 61 to the height of the rise end position.

Then, the control device 31 moves the unmanned aerial vehicle 30 to a position immediately above the receiving portion 61. The control device 31 may move the unmanned aerial vehicle 30 to a position immediately above the receiving portion 61 by performing image recognition on the receiving portion 61.

Figure 9:
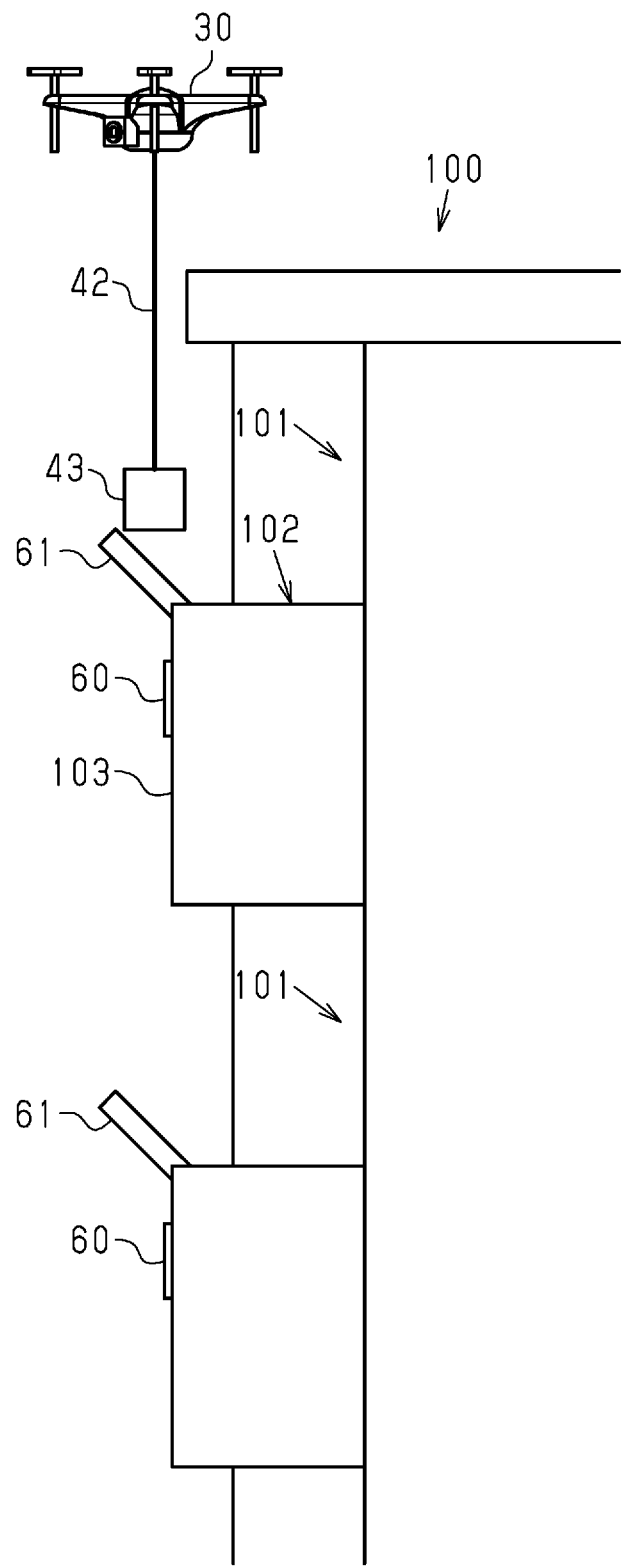
FIG. 9 is a diagram illustrating the placing process in the first embodiment.

FIG. 9 shows a state in which a cable 42 is lowered by the unmanned aerial vehicle 30. The control device 31 uses the captured data acquired from the capturing device 39 to recognize a receiving portion 61. While recognizing, the control device 31 rotates the reel 41 to let the cable 42 out. The unmanned aerial vehicle 30 lowers the cable 42 by the rise distance L. Since the receiving portions 61 do not overlap as viewed from above the multi-dwelling unit 100, the cable 42 does not interfere with another receiving portion 61. When the package 43 lands on the receiving portion 61, the control device 31 separates the package 43. After the separated package 43 is placed on the receiving portion 61, the package 43 slides down on the front surface 61B of the receiving portion 61 and into the balcony 102.

The advantages of the first embodiment will now be described.

(1-1) The control device 31 for the unmanned aerial vehicle 30 acquires the identification information of each dwelling unit 101 by reading a corresponding identification information indicator 60 at the position seen from outside of a corresponding delivery destination candidate. Thus, even if the dwelling units 101 each have a similar appearance or the dwelling unit 101 has no delivery history, the unmanned aerial vehicle 30 can identify the dwelling unit 101 of the delivery destination This allows the unmanned aerial vehicle 30 to deliver each package 43 to a corresponding dwelling unit 101.

(1-2) The dwelling unit 101 of the delivery destination candidate includes the receiving portion 61, which receives the package 43. Further, the control device 31 recognizes the receiving portion 61 and identifies the receiving portion 61 as the receiving position. This eliminates the need for the user to directly receive the package 43. Accordingly, the unmanned aerial vehicle 30 maximally avoids approaching the user.

(1-3) The unmanned aerial vehicle 30 rises to the rise end position and then lowers the cable 42, which has the end to which the package 43 is fixed, thereby placing the package 43 on the receiving portion 61. Thus, the unmanned aerial vehicle 30 can perform a delivery task without continuing to hover in front of the dwelling unit 101. This prevents the unmanned aerial vehicle 30 from unintentionally capturing a resident and prevents its propeller or the like from contacting the residence or the like during the task.

(1-4) The unmanned aerial vehicle 30 acquires the rise distance L from the rise start position, which corresponds to the height of the receiving portion 61, to the rise end position and lowers the cable 42 having the end to which the package 43 is fixed by a length corresponding to the rise distance L. This allows the cable 42 to be let out by the exact length.

(1-5) The receiving portions 61 do not overlap one another as viewed from above. Thus, when the unmanned aerial vehicle 30 lowers the cable 42 toward the receiving portion 61 of the dwelling unit 101 of the delivery destination, the cable 42 does not interfere with the receiving portion 61 of another dwelling unit 101. This prevents the package 43 and the cable 42 from contacting an object before the package 43 lands on the receiving portion 61.

(1-6) The captured data obtained by capturing the identification information indicators 60 is used to acquire the identification information of the delivery destination candidates. This allows the delivery destination to be identified efficiently.

(1-7) Within a period from when the unmanned aerial vehicle 30 reaches the delivery area to when the unmanned aerial vehicle 30 places the package at the receiving position, a notification is sent to the user device 20 used by the user who receives the package 43. This allows the user to check the delivery status of the package 43.

(1-8) The dwelling units 101 of the multi-dwelling unit 100 each have a similar appearance. Thus, it is difficult to identify the dwelling unit 101 of the delivery destination only based on the appearance. In the embodiment, the dwelling unit 101 of the delivery destination can be identified using the identification information indicator 60 corresponding to the position of each dwelling unit 101 on the side surface of the multi-dwelling unit 100. This allows the unmanned aerial vehicle 30 to delivery each package to a corresponding dwelling unit 101 of the multi-dwelling unit 100.

(1-9) The identification information indicator 60 is a two-dimensional code. This allows the unmanned aerial vehicle 30 to receive various types of information including the identification information in a relatively small space.

Second Embodiment

The logistics system according to a second embodiment will now be described with reference to FIGS. 10 and 11. In the first embodiment, the identification information indicators 60 are arranged on the side surface (wall) of the multi-dwelling unit 100. The second embodiment is different from the first embodiment in that the identification information indicators 60 are respectively arranged on the front surfaces (upper surface) of the receiving portions 61.

Figure 10:
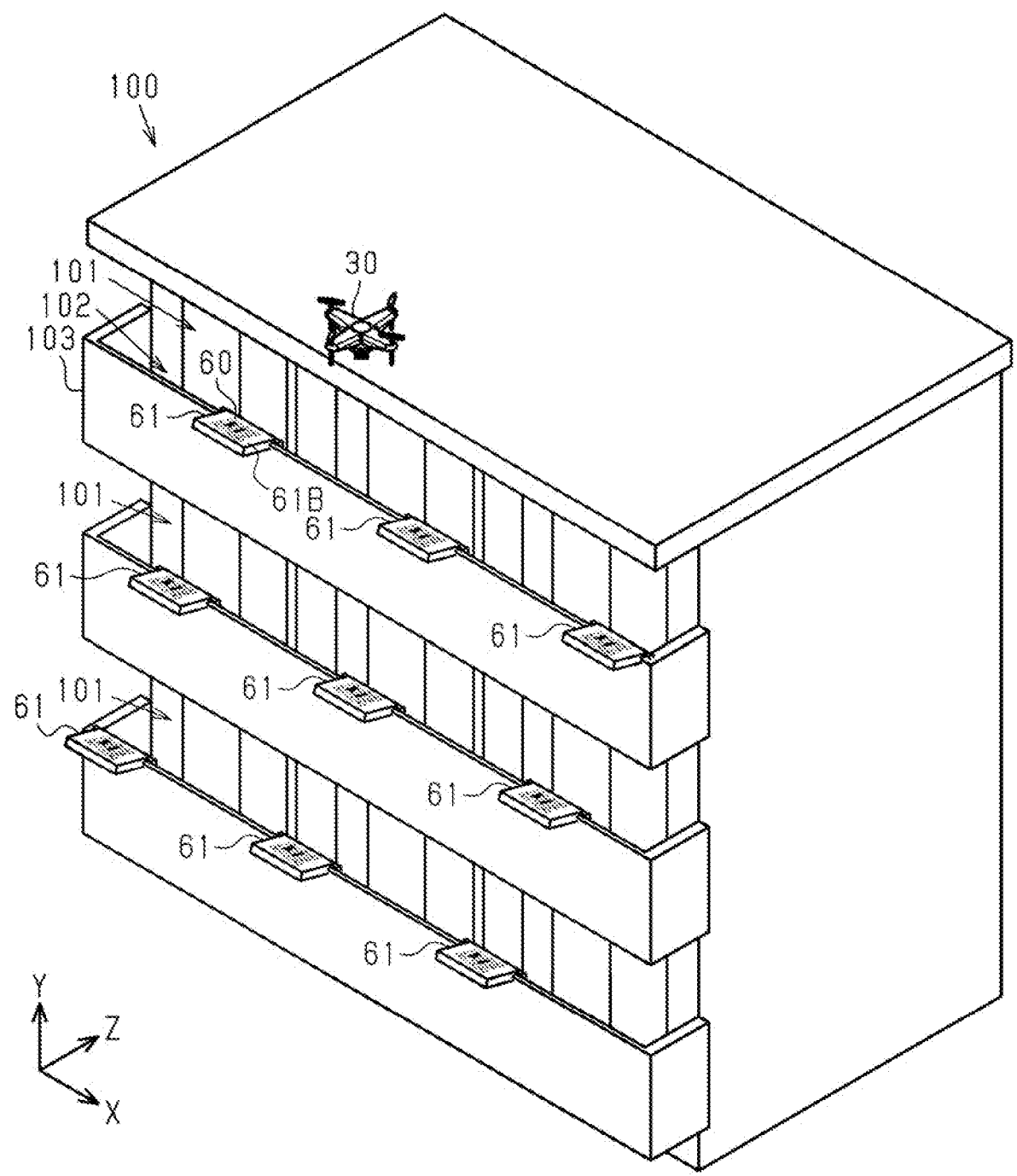
FIG. 10 is a diagram schematically showing the multi-dwelling unit including delivery destination candidates according to a second embodiment.

As shown in FIG. 10, the receiving portion 61 of each dwelling unit 101 includes a corresponding identification information indicator 60 on the front surface 61B. The receiving portions 61 are each located at a different position in the width direction X. Thus, the identification information indicators 60 do not overlap one another (i.e., are shifted from one another) as viewed from above the multi-dwelling unit 100. The inclination angle θ of each receiving portion 61 is an angle at which the unmanned aerial vehicle 30 located above the receiving portion 61 can read the identification information from the identification information indicator 60.

The two-dimensional code of each identification information indicator 60 includes information indicating the size of the two-dimensional code displayed on the identification information indicator 60. For example, the size of the displayed two-dimensional code in the information is 150 mm×150 mm.

Each receiving portion 61 may be constantly located at a position at which the receiving portion 61 projects outward from the balcony 102 (i.e., the outer position 64; see FIG. 4). Alternatively, the receiving portion 61 may be located at the outer position 64 when the user is scheduled to receive the package 43, and the receiving portion 61 may be located at the inner position 63 (see FIG. 4) when the user is not scheduled to receive the package 43.

After reaching the delivery area including the delivery destination, the unmanned aerial vehicle 30 moves to a position above the multi-dwelling unit 100. When the body of the unmanned aerial vehicle 30 reaches the position above the multi-dwelling unit 100, the capturing device 39 downwardly directs the optical axis of the capturing device 39 to capture the identification information indicators 60.

Figure 11:
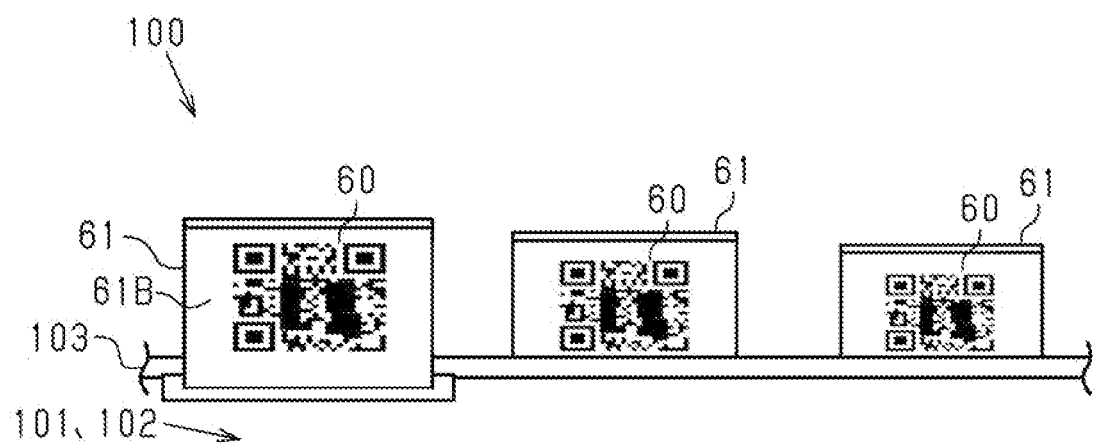
FIG. 11 is a plan view showing part of the multi-dwelling unit in the second embodiment.

FIG. 11 shows a state in which multiple identification information indicators 60 are viewed from above the multi-dwelling unit 100. The identification information indicators 60 on different floors do not overlap one another. As the relative distance from the capturing device 39 to an identification information indicator 60 becomes longer, the identification information indicator 60 looks smaller. That is, as the floor on which the identification information indicator 60 becomes lower, the identification information indicator 60 looks smaller.

The control device 31 uses the captured data to acquire the identification information from the images of the identification information indicators 60. The control device 31 refers to the delivery data 50 to identify the delivery destination of the package 43 based on the acquired identification information. Further, the control device 31 identifies, as the receiving position, the position of the identification information indicator 60 identified as the delivery destination.

In addition, the control device 31 compares the size of the two-dimensional code in the capture image obtained by the capturing device 39 with the size included in the information of the two-dimensional code. Then, the control device 31 refers to the comparison result to find the relative height from the capturing device 39. The control device 31 may store, in the memory unit 36, the data in which the relative distance between the capturing device 39 and the identification information indicator 60 is associated with the apparent size of the two-dimensional code seen from the capturing device 39. The control device 31 may use this data to find the relative height from the identification information indicator 60 to the capturing device 39.

After finding the relative height from the identification information indicator 60 to the capturing device 39, the control device 31 lowers the cable 42 by a length equivalent to the relative height. At this time, the position of the identification information indicator 60 matches that of the receiving portion 61. This eliminates the need for the control device 31 to recognize the position of the receiving portion 61 in addition to that of the identification information indicator 60. As a result, the package 43 is placed on the receiving portion 61 of the delivery destination.

In other words, the second embodiment has no step of elevating the unmanned aerial vehicle 30 from the rise start position, which is in front of the receiving portion 61 of the delivery destination, to the rise end position. After reaching the delivery area including the delivery address, the unmanned aerial vehicle 30 only needs to move to a position above the multi-dwelling unit 100 to capture the identification information indicators 60. This allows the unmanned aerial vehicle 30 to identify the delivery destination.

The second embodiment provides the following advantage in addition to advantages (1-1) to (1-3), (1-5) to (1-7), and (1-9) of the first embodiment.

(2-1) Each receiving portion 61 includes a corresponding identification information indicator 60. This allows the delivery destination and the receiving position of the delivery destination to be identified at the same time. Thus, the control device 31 efficiently identifies the delivery destination.

The above embodiments may be modified as follows. The above embodiments and the following modifications can be combined as long as the combined modifications remain technically consistent with each other.

Identification Information Indicator

The identification information indicator 60 may include a barcode instead of, or in addition to, a two-dimensional code. Alternatively, the identification information indicator 60 may include a character or a figure. For example, a room number may be used as the identification information indicator 60. As another option, the unmanned aerial vehicle 30 may store, in the memory unit 36, data in which the delivery address is associated in advance with the letter or figure included in the identification information indicator 60. Then, the read identification information indicator 60 may be compared with the data in which the delivery address is associated in advance with the letter or figure to identify whether the delivery destination candidate corresponding to the identification information indicator 60 is the delivery address.

In the first embodiment, the identification information indicators 60 are arranged on the parapet 103. In the aspect in which the identification information indicators 60 are arranged in an area excluding the receiving portion 61, a mark other than the identification information may be arranged on the front surface 61B of each receiving portion 61 such that the unmanned aerial vehicle 30 readily recognizes the receiving portion 61.

Figure 12:
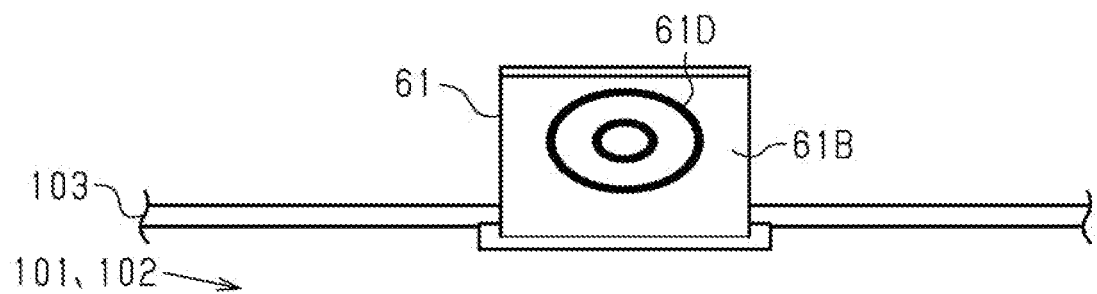
FIG. 12 is a plan view showing part of the multi-dwelling unit according to a modification.

FIG. 12 shows a marker 61D that is displayed on the receiving portion 61. By aligning the position of the marker 61D with the package 43 arranged on the end of the cable 42, the control device 31 lets the cable 42 out to unload the package 43. The displaying of the marker 61D on the receiving portion 61 allows the control device 31 to readily recognize the position of the receiving portion 61.

The identification information indicator 60 may be located at a position other than the balcony 102 that can be seen from outside (e.g., the outer wall or the window).

The identification information indicator 60 may be arranged on a standalone house. In this case, the identification information indicator 60 may be arranged at any position if the identification information indicator 60 is located at a position where the identification information indicator 60 is readable from outside by a reading device.

In the second embodiment, the two-dimensional code displayed on the identification information indicator 60 may include information indicating the height of the dwelling unit 101, including the identification information indicator 60, from the ground. In this case, the control device 31 calculates the distance of lowering the cable by subtracting, from the height of the unmanned aerial vehicle 30, a height that is based on the information indicating the height of the dwelling unit 101. Then, the control device 31 drives the reel drive unit 40 to lower the cable 42 by the cable lowering distance.

Receiving Portion

The receiving portion 61 may be constantly fixed at the outer position 64.

In the second embodiment, the identification information indicator 60 is displayed on the inclined front surface 61B of the receiving portion 61. In this case, when the inclination angle θ is relatively large, the identification information indicator 60 is significantly distorted as viewed from above the receiving portion 61. Thus, if the inclination angle θ is known, an image obtained through projective transformation may be displayed on the front surface 61B of the receiving portion 61. Specifically, the image is obtained by transforming the identification information indicator 60 based on the inclination angle θ such that the identification information indicator 60 seems less distorted as viewed from above the receiving portion 61. In this case, the identification information indicator 60 is distorted as viewed from the front. In contrast, when the identification information indicator 60 is arranged in the balcony 102 with an inclination of the inclination angle θ as shown in FIG. 4, the identification information indicator 60 seems less distorted as viewed from above. This allows the identification information to be readily acquired.

The receiving portion 61 does not have to be inclined. Instead, the receiving portion 61 may be arranged such that its upper surface is horizontal. Additionally, the receiving portion 61 does not need to have the form of a plate and may have the form of a box or a bag.

The receiving portion 61 does not have to project out of the balcony 102. Instead, for example, the receiving portion 61 may be a box-shaped member arranged in front of the dwelling unit 101.

Movement Control Process

When the delivery of packages is completed, the control device 31 may register the surface of the multi-dwelling unit 100 on which the identification information indicators 60 are located.

Figure 13:
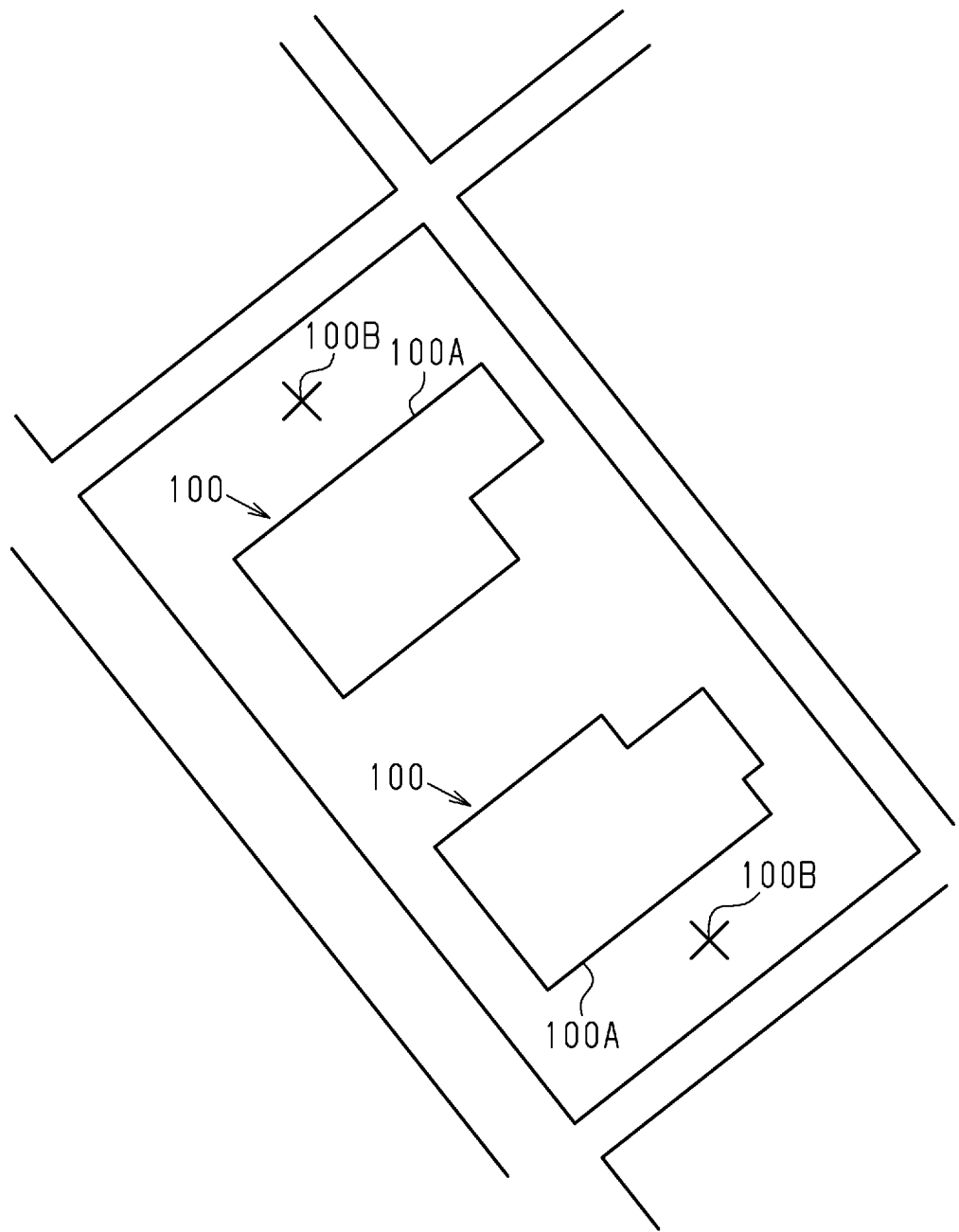
FIG. 13 is a plan view showing multi-dwelling units according to another modification.

For example, as shown in FIG. 13, when identifying a side surface 100A on which the identification information indicators 60 are located, the control device 31 sends, to the server 10, information used to identify the side surface 100A. The server 10 records the information, which is used to identify the side surface 100A on which the identification information indicators 60 are located, in the memory unit 12 together with the identification information of the multi-dwelling unit 100. Additionally, the control device 31 may register a capture position in the multi-dwelling unit 100 at which the largest number of identification information indicators 60 can be captured. When determining an optimal capture position 100B at which the largest number of identification information indicators 60 can be captured, the unmanned aerial vehicle 30 sends the coordinate information of the capture position 100B to the server 10. The server 10 records, in the memory unit 12, the coordinate information of the capture position 100B together with the identification information of the multi-dwelling unit 100.

The server 10 further records, in the memory unit 12, the information used to identify the side surface 100A on which the identification information indicators 60 are located or the coordinate information of the capture position 100B. Upon request from the unmanned aerial vehicle 30, the server 10 then sends the information used to identify the side surface 100A or the coordinate information of the capture position 100B to the unmanned aerial vehicle 30. Thus, the unmanned aerial vehicle 30 acquires the identification information using the information used to identify the side surface 100A or the coordinate information of the capture position 100B. This allows the unmanned aerial vehicle 30 to efficiently identify the dwelling unit 101 of the delivery destination.

Identification Information Acquiring Process

The control device 31 may move the unmanned aerial vehicle 30 to read the identification information indicators 60 of the dwelling units 101 one by one using the capturing device 39.

The device used to read the identification information indicator 60 is not limited to the capturing device 39. Any device may be used if it can read the identification information indicator 60. For example, when the identification information indicator 60 is a barcode, a device such as a scanner that detects a reflected wave by emitting laser beam may be used to acquire the identification information.

Position Identifying Process

In the first embodiment, in the position identifying process, captured data is used to identify the receiving position. Instead, or in addition, the predetermined positional relationship between the identification information indicator 60 and the receiving portion 61 may be used to identify the receiving position. In this method, the positional relationship between the identification information indicator 60 and the receiving portion 61 needs to be determined in advance as a prior condition. For example, in a case in which the position of the identification information indicator 60 in the width direction X is the same as the position of the receiving portion 61 in the width direction X, the unmanned aerial vehicle 30 moves to the front side of the identification information indicator 60 and then rises in the height direction Y. Further, the unmanned aerial vehicle 30 recognizes the receiving portion 61 using the capturing device 39, and then moves to a position immediately above the receiving portion 61. When the positional relationship between the identification information indicator 60 and the receiving portion 61 is determined in advance, the control device 31 can identify the receiving portion 61 efficiently.

Placing Process

If the unmanned aerial vehicle 30 is located above the receiving portion 61 of the delivery destination, the unmanned aerial vehicle 30 may unload the package 43 at a position other than the upper side of the multi-dwelling unit 100. The unmanned aerial vehicle 30 may hover at a predetermined height (e.g., at a position above the receiving portion 61 by about 1 m) to unload the package 43.

The control device 31 may place the package 43 at a position other than the receiving portion 61. For example, in the case of the delivery of the package 43 to a standalone house, the control device 31 may cause the package 43 to be unloaded in front of the dwelling unit 101. Alternatively, the user may remove the package 43 arranged at the end of the cable 42 from the cable 42 to receive the package 43.

Configuration of Logistics System

The unmanned aerial vehicle 30 may include a speaker and a microphone. Based on an instruction, the speaker may send a sound indicating that the delivery is completed to the control device 31. Further, based on an instruction, the speaker may send, to the control device 31, a sound that warns a person around the unmanned aerial vehicle 30 not to approach the unmanned aerial vehicle 30. Furthermore, based on an instruction, the microphone may accept a sound that is based on the speech of the user. The control device 31 performs sound recognition on the received sound data. Based on the result of the sound recognition, the control device 31 determines the contents of the speech (e.g., the contents of the instructions to the user).

The logistics system 1 may include a manager device in addition to the server 10, the user device 20, and the unmanned aerial vehicle 30. The manager device is used by a manager who manages the logistics system 1 or by a manager who manages the unmanned aerial vehicle 30. For example, a manager offers the service of delivering an item to a user. The manager device may include a smartphone (multi-functional telephone terminal), a tablet terminal, a personal computer, a wearable computer, or another information processing device capable of displaying images, and thus has a similar configuration to the user device 20. The manager may use the manager device to monitor the task of the unmanned aerial vehicle 30 lowering the package 43.

In each of the above embodiments, the unmanned aerial vehicle 30 executes the processes related to delivery, including the movement control process, the identification information acquiring process, the delivery destination identifying process, the position identifying process, the placing process, and the notification process. Instead, the server 10 may execute at least one of these processes. In a case where the unmanned aerial vehicle 30 executes some of the above processes and the server 10 executes the remaining processes, the unmanned aerial vehicle 30 and the server 10 send and receive the results of the processes to and from each other if the results need to be shared. For example, the unmanned aerial vehicle 30 sends its flying position to the server 10, and the server 10 sends an instruction to the unmanned aerial vehicle 30. Further, the unmanned aerial vehicle 30 sends the captured data captured by the capturing device 39 to the server 10. The server 10 performs image processing on the received captured data to acquire the identification information and the like. Then, the server 10 sends the identification information to the unmanned aerial vehicle 30.

The technical aspect that are understood from this modification will now be described.

[Aspect] An information processing system, comprising:
an unmanned aerial vehicle; and
one or more computers that control the unmanned aerial vehicle, wherein
the one or more computers are configured to execute:
a movement control process that causes moves the unmanned aerial vehicle to move to a delivery area including a delivery address to which a package is to be delivered, the delivery area including one or more delivery destination candidates, and each of the one or more delivery destination candidates including an identification information indicator located at a position where the identification information indicator is readable from outside of the delivery destination candidate;
an identification information acquiring process that acquires identification information associated with each of the one or more delivery destination candidates by reading a corresponding one of the one or more identification information indicators;
a delivery destination identifying process that identifies, as a delivery destination, a delivery destination candidate in which the acquired identification information matches the delivery address;
a position identifying process that identifies a receiving position of the package based on a position of the identified delivery destination; and
a placing process that causes the unmanned aerial vehicle to place the package at the identified receiving position.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. An unmanned aerial vehicle, comprising:
at least one memory configured to store computer program code; and
at least one processor configured to read the program code and operate as instructed by the program code, the program code comprising:
movement control code configured to cause at least one of the at least one processor to move the unmanned aerial vehicle to a delivery area including a delivery address to which a package is to be delivered, the delivery area including one or more delivery destination candidates, and each of the one or more delivery destination candidates including an identification information indicator located at a position where the identification information indicator is readable from outside;
identification information acquiring code configured to cause at least one of the at least one processor to acquire identification information associated with each of the one or more delivery destination candidates by reading a first corresponding identification information indicator from among one or more identification information indicators;
delivery destination identifying code configured to cause at least one of the at least one processor to identify, as a delivery destination, a delivery destination candidate in which the identification information matches the delivery address;
position identifying code configured to cause at least one of the at least one processor to identify a receiving position of the package based on a position of the delivery destination; and
placing code configured to cause at least one of the at least one processor to place the package at the receiving position,
wherein the one or more delivery destination candidates respectively include receiving portions, each receiving portion being configured to receive the package,
wherein the position identifying code is configured to cause at least one of the at least one processor to identify a position of a first receiving portion associated with the delivery destination and identify the first receiving portion from among the receiving portions, wherein the identification information further comprises a plurality of room numbers corresponding to a plurality of dwelling units of a multi-dwelling unit, and wherein the receiving portions are included in the multi-dwelling unit, correspond to the plurality of dwelling units, and are shifted from one another such that the receiving portions do not overlap one another as viewed from above the multi dwelling unit.

2. The unmanned aerial vehicle according to claim 1, wherein the placing code is configured to cause at least one of the at least one processor to elevate the unmanned aerial vehicle to a rise end position and then lowers a cable that has an end to which the package is fixed, thereby placing the package on the receiving portion.

3. The unmanned aerial vehicle according to claim 2, wherein the placing code is configured to cause at least one of the at least one processor to record a rise distance from a rise start position to the rise end position and lowers the cable having the end to which the package is fixed by a length corresponding to the rise distance, the rise start position corresponding to a height of the receiving portion.

4. The unmanned aerial vehicle according to claim 1, wherein each of the receiving portions includes a second corresponding identification information indicator located at a position on a corresponding receiving portion where the identification information indicator is capturable from outside, and the position identifying code is configured to cause at least one of the at least one processor to identify the delivery destination using captured data that is obtained by capturing the one or more identification information indicators.

5. The unmanned aerial vehicle according to claim 1, wherein the placing code is configured to cause at least one of the at least one processor to move the unmanned aerial vehicle to a position above the receiving portion corresponding to the delivery destination and lowers a cable toward the receiving portion, the cable having an end to which the package is fixed.

6. The unmanned aerial vehicle according to claim 1, wherein the identification information acquiring code is configured to cause at least one of the at least one processor to:

acquire, from a camera, captured data that is obtained by capturing the one or more identification information indicators, wherein the one or more identification information indicators are respectively arranged on the one or more delivery destination candidates; and acquire the identification information associated with each of the one or more delivery destination candidates, based on an image of a second corresponding identification information indicator included in the captured data.

7. The unmanned aerial vehicle according to claim 1, wherein the unmanned aerial vehicle is further configured to execute a notification process that sends a notification to a user device used by a user who receives the package within a period from when the unmanned aerial vehicle reaches the delivery area to when the unmanned aerial vehicle places the package at the receiving position.

8. The unmanned aerial vehicle according to claim 1, wherein the one or more identification information indicators are respectively arranged on the plurality of dwelling units.

9. The unmanned aerial vehicle according to claim 1, wherein the one or more identification information indicators each display a two-dimensional code that includes the identification information, and the identification information acquiring code is configured to cause at least one of the at least one processor to acquire the identification information using captured data that is obtained by capturing the two-dimensional code.

10. An information processing method for a computer that controls an unmanned aerial vehicle to execute:

a movement control process that moves the unmanned aerial vehicle to a delivery area including a delivery address to which a package is to be delivered, the delivery area including one or more delivery destination candidates, and each of the one or more delivery destination candidates including an identification information indicator located at a position where the identification information indicator is readable from outside;

an identification information acquiring process that acquires identification information associated with each of the one or more delivery destination candidates by reading a first corresponding identification indicator from among one or more identification information indicators;

a delivery destination identifying process that identifies, as a delivery destination, a delivery destination candidate in which the identification information matches the delivery address;

a position identifying process that identifies a receiving position of the package based on a position of the delivery destination; and a placing process that places the package at the receiving position, wherein the one or more delivery destination candidates respectively include receiving portions, each receiving portion being configured to receive the package, wherein the position identifying comprises identifying a position of a first receiving portion associated with the delivery destination and identify the first receiving portion from among the receiving portions, wherein the identification information further comprises a plurality of room numbers corresponding to a plurality of dwelling units of a multi-dwelling unit, and wherein the receiving portions are included in the multi-dwelling unit, correspond to the plurality of dwelling units, and are shifted from one another such that the receiving portions do not overlap one another as viewed from above the multi-dwelling unit.

11. A non-transitory computer-readable medium that records a control program that causes a computer that controls an unmanned aerial vehicle to execute:

a movement control process that moves the unmanned aerial vehicle to a delivery area including a delivery address to which a package is to be delivered, the delivery area including one or more delivery destination candidates, and each of the one or more delivery destination candidates including an identification information indicator located at a position where the identification information indicator is readable from outside;

an identification information acquiring process that acquires identification information associated with each of the one or more delivery destination candidates by reading a first corresponding identification information indicator from among one or more identification information indicators;
a delivery destination identifying process that identifies, as a delivery destination, a delivery destination candidate in which the identification information matches the delivery address;
a position identifying process that identifies a receiving position of the package based on a position of the delivery destination; and
a placing process that places the package at the receiving position,
wherein the one or more delivery destination candidates respectively include receiving portions, each receiving portion being configured to receive the package,
wherein the position identifying comprises identifying a position of a first receiving portion associated with the delivery destination and identify the first receiving portion from among the receiving portions,
wherein the identification information further comprises a plurality of room numbers corresponding to a plurality of dwelling units of a multi-dwelling unit, and
wherein the receiving portions are included in the multi-dwelling unit, correspond to the plurality of dwelling units, and are shifted from one another such that the receiving portions do not overlap one another as viewed from above the multi-dwelling unit.

* * * * *